United States Patent
Ferri

(10) Patent No.: US 7,578,355 B2
(45) Date of Patent: Aug. 25, 2009

(54) SWAY BLOCK OF A THREE-POINT IMPLEMENT HITCH

(75) Inventor: Mauro Ferri, Ravarino (IT)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/052,471

(22) Filed: Mar. 20, 2008

(65) Prior Publication Data
US 2008/0230241 A1 Sep. 25, 2008

(30) Foreign Application Priority Data
Mar. 20, 2007 (IT) .......................... BO2007A0200

(51) Int. Cl.
*A01B 59/041* (2006.01)
(52) U.S. Cl. .................................... 172/450
(58) Field of Classification Search ............... 172/450, 172/439, 667, 317, 324, 275, 133, 443, 272, 172/273; 280/479.2, 474, 456.1, 477, 478.1, 280/463
See application file for complete search history.

(56) References Cited

U.S. PATENT DOCUMENTS

| 4,116,458 | A | * | 9/1978 | Berg ........................... 280/474 |
| 4,640,522 | A | * | 2/1987 | Teich ......................... 172/450 |
| 5,201,539 | A | * | 4/1993 | Mayfield ................. 280/479.2 |

* cited by examiner

*Primary Examiner*—Robert E Pezzuto
(74) *Attorney, Agent, or Firm*—Patrick M. Sheldrake; John William Stader; Michael G. Harms

(57) ABSTRACT

A sway block for a three-point hitch of an agricultural implement has a frame for supporting a tow hook; and the frame in turn has two substantially parallel right-angle plates. A respective pair of levers is hinged to each right-angle plate by pins; and each pair of levers is associated with a respective lock member operated from above by an operator using an actuating mechanism. The sway block performs the dual function of preventing sway and supporting a tow member.

9 Claims, 4 Drawing Sheets

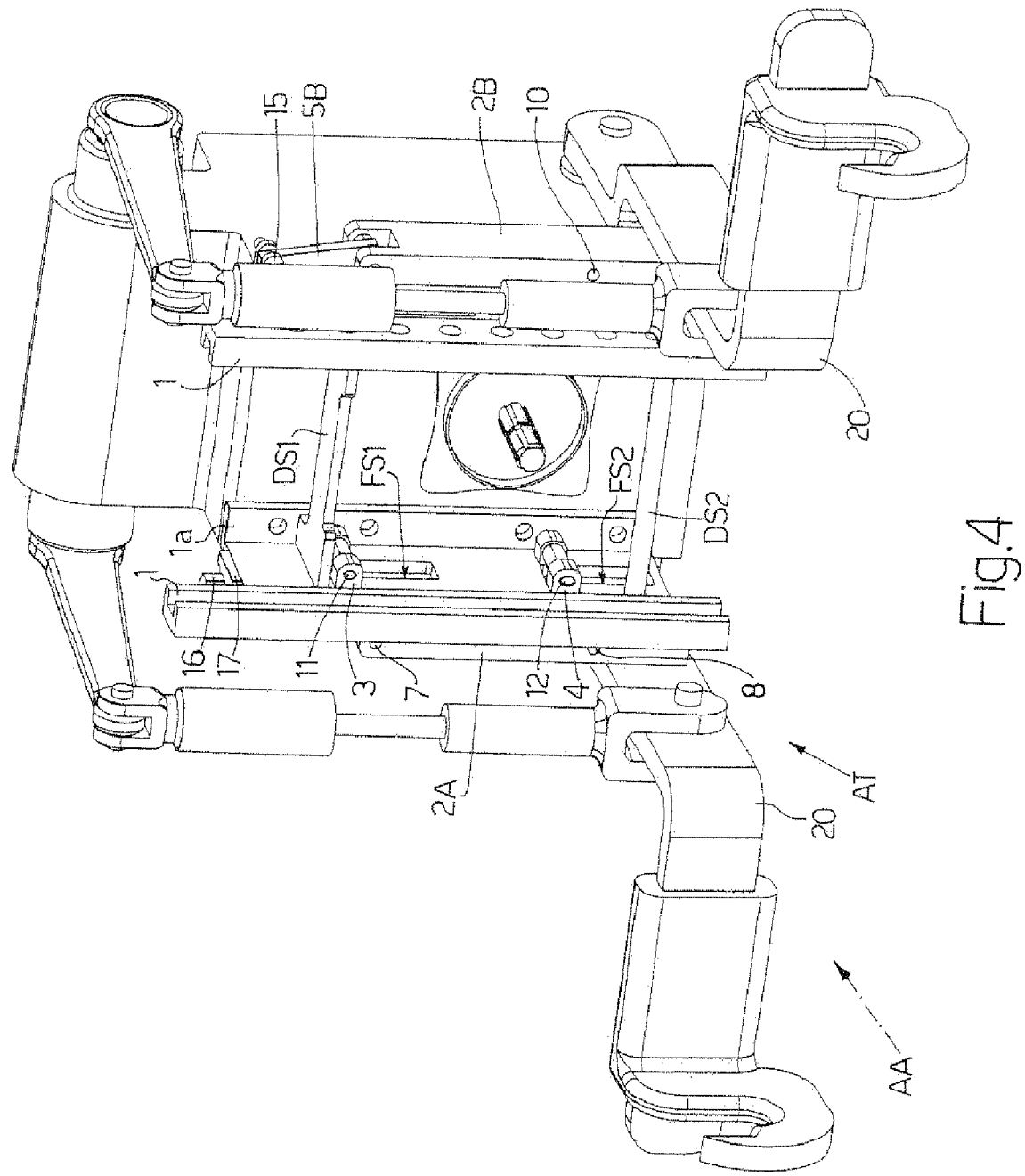

SWAY BLOCK OF A THREE-POINT IMPLEMENT HITCH

FIELD OF THE INVENTION

The present invention relates to a sway block of a three-point implement hitch.

BACKGROUND OF THE INVENTION

One drawback of currently used sway blocks for a three point hitch lies in their maneuvering and adjustment at the bottom of the implement hitch. When the implement is attached maneuvering the sway block may prove awkward and extremely dangerous to the operator. In fact, if adjusting the implement hitch by inserting a hand inside the space housing, any undesired lateral movement of the hitch could result in crushing of the operator's hand.

SUMMARY OF THE INVENTION

It is therefore an object of the present invention to provide a safe, easy-to-maneuver sway block designed to eliminate the aforementioned drawbacks as well as to provide a sway block for a three-point farm implement hitch, designed to eliminate the aforementioned drawbacks.

A further advantage of the invention lies in the sway block performing the dual function of supporting the tow hook and preventing sway of the bottom arms of a three-point farm implement hitch.

The main advantage of the present invention lies in enabling the adjustment of the sway block from above, or even from the driver's cab.

Another advantage of the invention lies in reducing the width of the sway block, which is extremely important for use with small tractors (for orchards, vineyards, etc.) which are narrower than multipurpose or standard tractors.

BRIEF DESCRIPTION OF THE DRAWINGS

The invention will now be described further, by way of example, with reference to the accompanying drawings, in which:

FIG. 4 shows a second perspective view of the sway block of FIGS. 1 and 2 fitted to a three-point hitch of a farm implement.

DESCRIPTION OF THE PREFERRED EMBODIMENT

Figure 1:
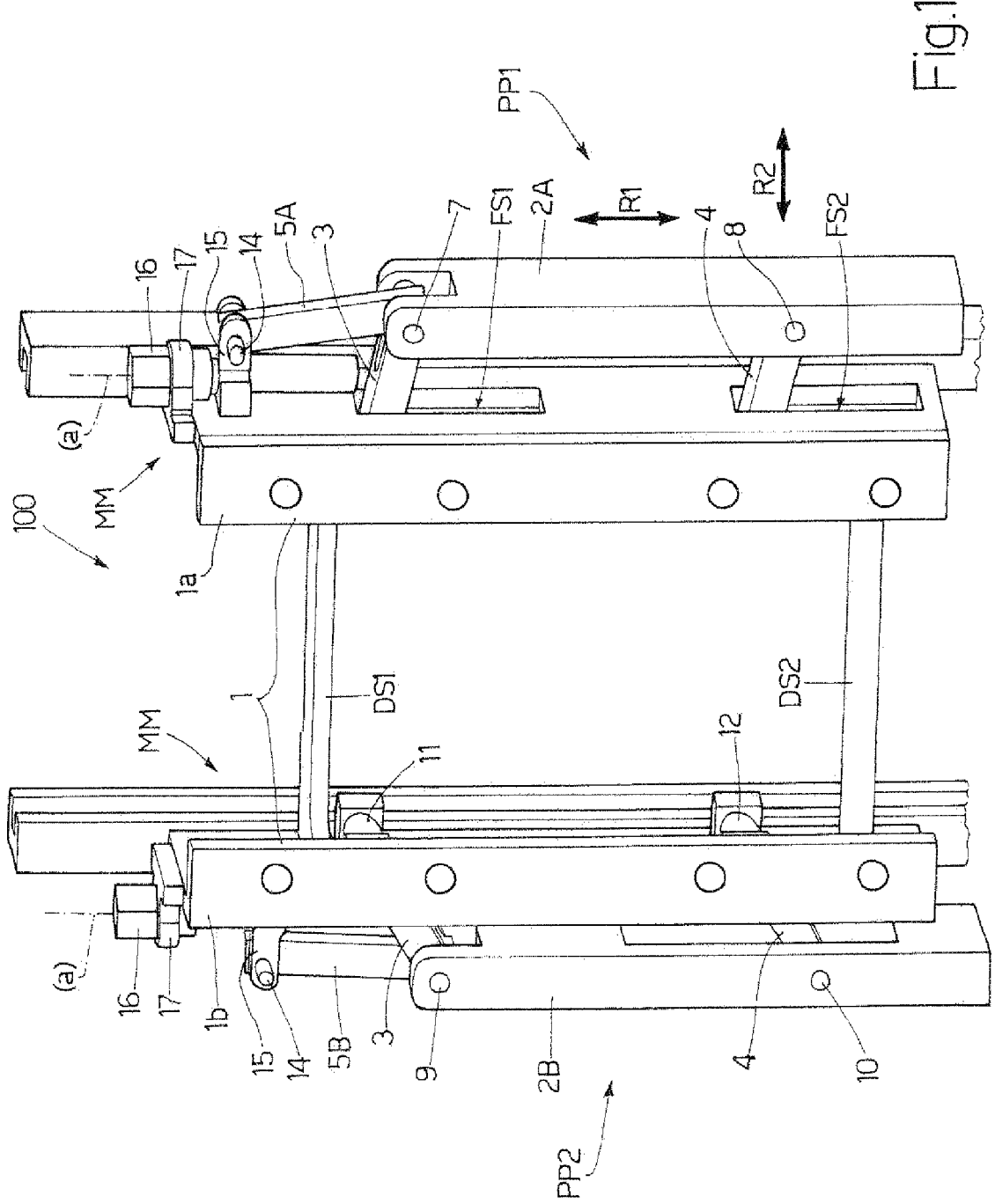
FIG. 1 shows a perspective view of a first embodiment of a sway block in accordance with the present invention.
Figure 2:
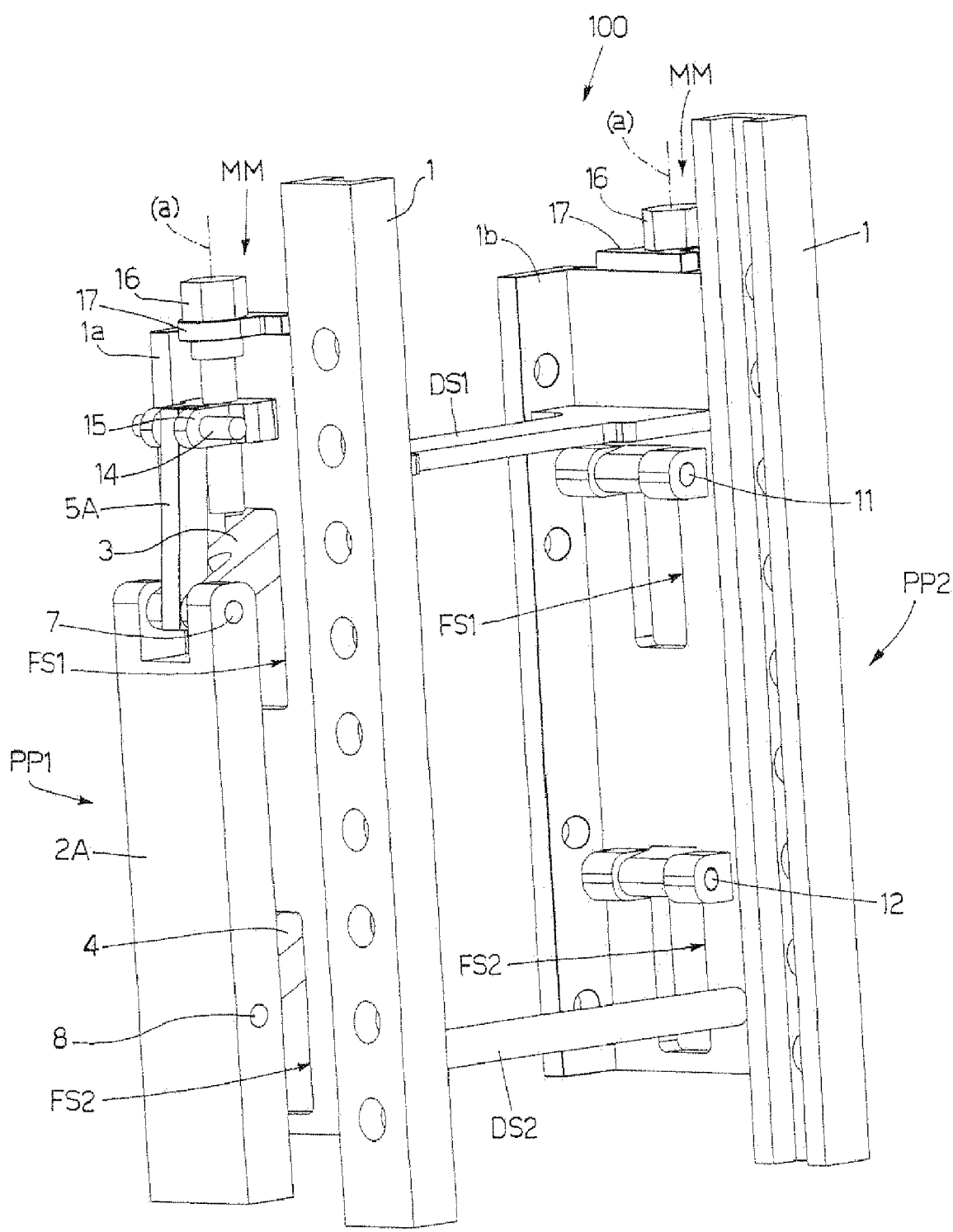
FIG. 2 shows a second perspective view of the sway block of FIG. 1.

FIGS. 1 and 2 show sway block 100 including a supporting frame 1, for a tow hook (not shown), integral with the rear of a tractor (not shown). Frame 1 having two substantially parallel right-angle plates 1a, 1b spaced apart by two spacers DS1, DS2.

Figure 3:
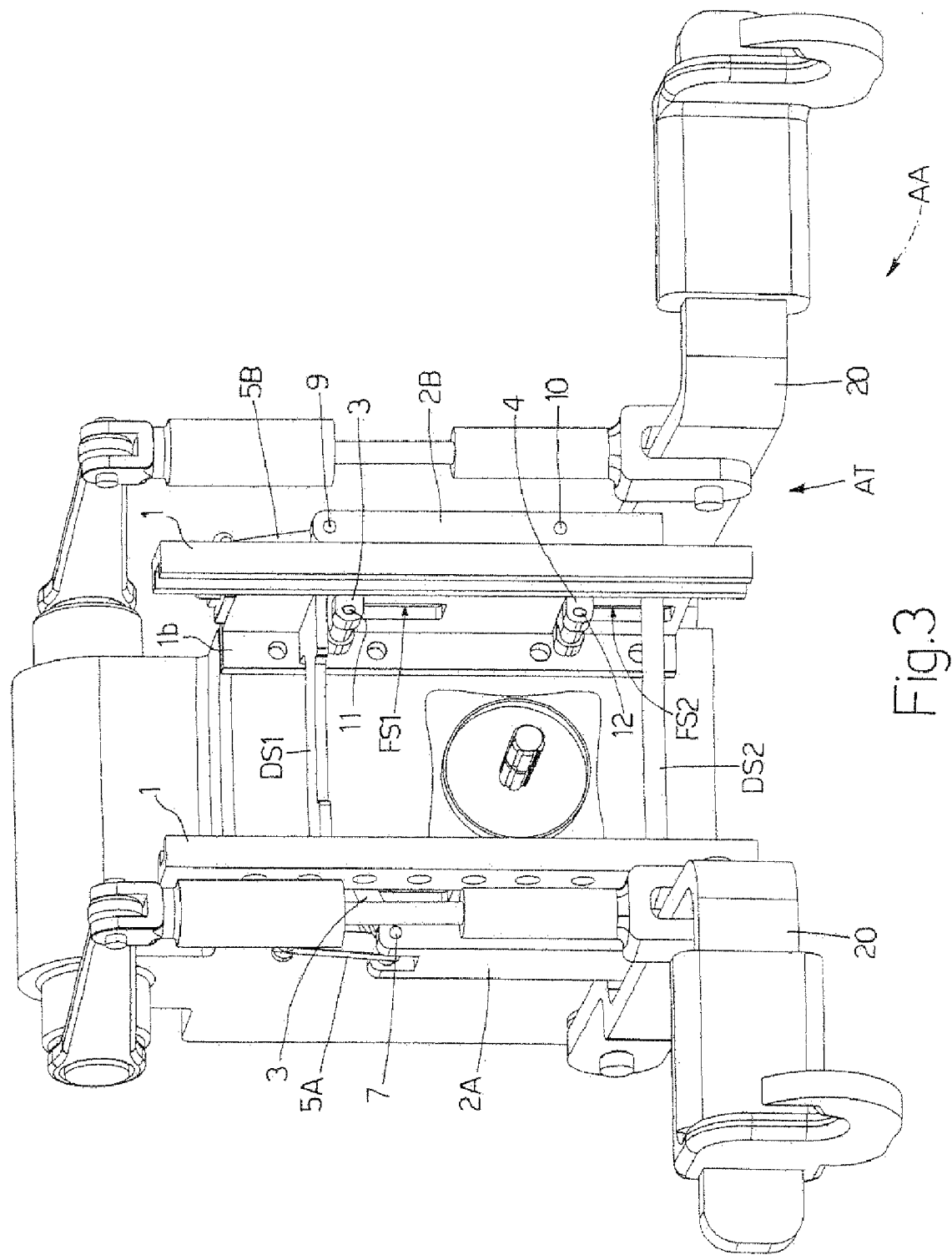
FIG. 3 shows a perspective view of the sway block of FIGS. 1 and 2 fitted to a three-point hitch of a farm implement.

Two levers 3, 4 are hinged to each right-angle plate 1a, 1b by respective pins 11, 12 (see FIGS. 2, 3). To reduce the overall width of sway block 100 as a whole, pins 11, 12 are advantageously housed inside the space defined by the two right-angle plates 1a, 1b.

To permit rotation of levers 3, 4, two slots FS1, FS2 are formed in each right-angle plate 1a, 1b. The two levers 3, 4 of right-angle plate 1a are hinged to a respective lock member 2A by respective pins 7, 8.

Similarly, the two levers 3, 4 of right-angle plate 1b are hinged to a respective lock member 2B by respective pins 9, 10. Levers 3, 4 of right-angle plate 1a and lock member 2A combine to form a first articulated parallelogram PP1. Similarly, levers 3, 4 of right-angle-plate 1b and lock member 2B combine to form a second articulated parallelogram PP2.

By virtue of articulated parallelograms PP1 and PP2, lock members 2A and 2B move vertically up and down in the direction shown by a first two-way arrow R1, and move back and forth in the direction shown by a second two-way arrow R2.

As shown particularly in FIGS. 1 and 2, levers 5A and 5B are hinged to pins 7 and 9 respectively. Each lever 5A, 5B is hinged to a respective pin 14 fitted to a respective slide 15 movable up and down in the direction indicated by two-way arrow R1. Any type of actuating mechanism can be used to move each slide 15 up and down.

In the embodiment shown in the attached drawings, an actuating mechanism MM comprises two screws 16 with a vertical axis (a). Each screw 16 is supported by a respective fixed drilled bush 17 integral with a respective right-angle plate 1a, 1b of supporting frame 1.

When the operator (not shown), working from above, tightens/loosens screws 16 (which react on fixed drilled bushes 17), slides 15 move as shown by arrow R1, thus also moving pins 14, about which respective levers 5A, 5B rotate and move, thus also moving respective articulated parallelograms PP1, PP2.

As they move vertically upwards (in one of the two directions indicated by arrow R1), lock members 2A, 2B also move outwards to lock the two bottom arms 20 of three-point implement hitch AT of a farm implement AA (not shown), thus achieving the desired effect, as shown in FIGS. 3, 4.

The invention claimed is:

1. A sway block in combination with a three-point hitch of an agricultural implement, the sway block comprising:
   a supporting frame having first and second substantially parallel right angle plates; and
   a first pair of levers hinged both to the first right-angle plate and to a first lock member and a second pair of levers hinged both to the second right-angle plate and a second lock member, wherein the lock members and pairs of levers are movable between first positions to second positions where the lateral distance between the lock members in the second position is greater than at the first position and wherein in the second position the lock members are in contact with respective lower arms of the three-point hitch.

2. A sway block as claimed in claim 1, further comprising:
   an actuating mechanism for each lock member wherein the first pair of levers and lock member, are actuated for movement independent of the second pair of levers and lock member, the actuator directly acting on the connections between upper levers of each pair of levers and their respective lock members.

3. A sway block as claimed in claim 1, wherein
   the first and second pair of levers are hinged respectively to the first and right-angle plate by pins.

4. A sway block as claimed in claim 3, wherein:
   the first and second pair of levers are associated with respective lock members, which are operable from an actuating mechanism positioned above the sway block.

5. A sway block as claimed in claim 3, wherein the levers in each pair of levers are parallel and their relative lock members and right angle plates are parallel forming respective articulated parallelograms.

6. A sway block as claimed in claim 3, wherein the pins are housed in a space defined by the first and second right-angle plates.

7. A sway block as claimed in claim 3, wherein two slots are formed in each right-angle plate to permit rotation of the levers such that the first positions of the first lock member is laterally adjacent first right angle plate and the first position of the second lock member is laterally adjacent the second right angle plate.

8. A sway block as claimed in claim 1, wherein:

a screw mounted above at least one lock member is connected to a movable slide, an actuation lever, hinged by a pin to both the upper lever of the lever pair and the respective lock member, and connected to the movable slide.

9. A sway block as claimed in claim 8, wherein each screw is supported by a respective drilled bush integral with a respective right-angle plate.

* * * * *